United States Patent
Li et al.

(10) Patent No.: US 6,636,508 B1
(45) Date of Patent: Oct. 21, 2003

(54) NETWORK RESOURCE CONSERVATION SYSTEM

(75) Inventors: Xuewen Li, Cary, NC (US); Samuel Henry Christie, IV, Cary, NC (US)

(73) Assignee: Nortel Networks Limted, St. Laurent (CA)

( * ) Notice: Subject to any disclaimer, the term of this patent is extended or adjusted under 35 U.S.C. 154(b) by 0 days.

(21) Appl. No.: 09/249,696

(22) Filed: Feb. 12, 1999

(51) Int. Cl.[7] .............................................. H04L 12/28
(52) U.S. Cl. ........................ 370/389; 370/402; 370/352
(58) Field of Search ................................ 370/252, 248, 370/249, 241, 351, 352, 353, 354, 445, 389, 400, 401, 402, 395.2, 431

(56) References Cited

U.S. PATENT DOCUMENTS

| | | | | |
|---|---|---|---|---|
| 5,138,614 A | * | 8/1992 | Baumgartner et al. ...... 370/261 |
| 5,610,904 A | * | 3/1997 | Eng et al. .................... 370/408 |
| 5,764,750 A | * | 6/1998 | Chau et al. .................. 379/229 |
| 5,966,427 A | * | 10/1999 | Shaffer et al. ............ 379/15.05 |
| 5,987,102 A | * | 11/1999 | Elliott et al. ............. 379/93.17 |
| 6,134,235 A | * | 10/2000 | Goldman et al. ........... 370/352 |
| 6,144,670 A | * | 11/2000 | Sponaugle et al. ......... 370/401 |
| 6,144,724 A | * | 11/2000 | Stovall .................... 379/93.05 |
| 6,154,465 A | * | 11/2000 | Pickett ....................... 370/466 |
| 6,157,635 A | * | 12/2000 | Wang et al. ................ 370/352 |
| 6,253,249 B1 | * | 6/2001 | Belzile ....................... 709/249 |
| 6,259,691 B1 | * | 7/2001 | Naudus ....................... 370/352 |
| 6,282,172 B1 | * | 8/2001 | Robles et al. ............... 370/230 |
| 6,320,955 B1 | * | 11/2001 | Bushnell ..................... 379/246 |
| 6,430,176 B1 | * | 8/2002 | Christie, IV ................ 370/355 |
| 6,490,275 B1 | * | 12/2002 | Sengodan ................... 370/356 |

* cited by examiner

*Primary Examiner*—David Vincent
(74) *Attorney, Agent, or Firm*—Withrow & Terranova, PLLC

(57) ABSTRACT

A communications network resource conservation system is provided for that conserves network bandwidth and improves voice quality. The method and apparatus permit users of H.323 terminal devices to talk to each other directly over the Internet thereby eliminating the need to use the resources of a telephone switch and a Public Switched Telephone Network (PSTN). Communication between users is established directly via packet network. In one embodiment, a voice path between users is directly established without routing the voice through a PSTN as for a typical telephone call and yet get supplementary services from the PSTN switch. The telephone call will be set up through the telephone switch and the PSTN as for a normal call, but, the voice path will be Intraswitched directly between the calling party and the called party via their packet network. In another embodiment, the invention provides a way to revert an Intraswitched call through the telephone switch automatically when needed to invoke supplemental features of telephony service.

24 Claims, 7 Drawing Sheets

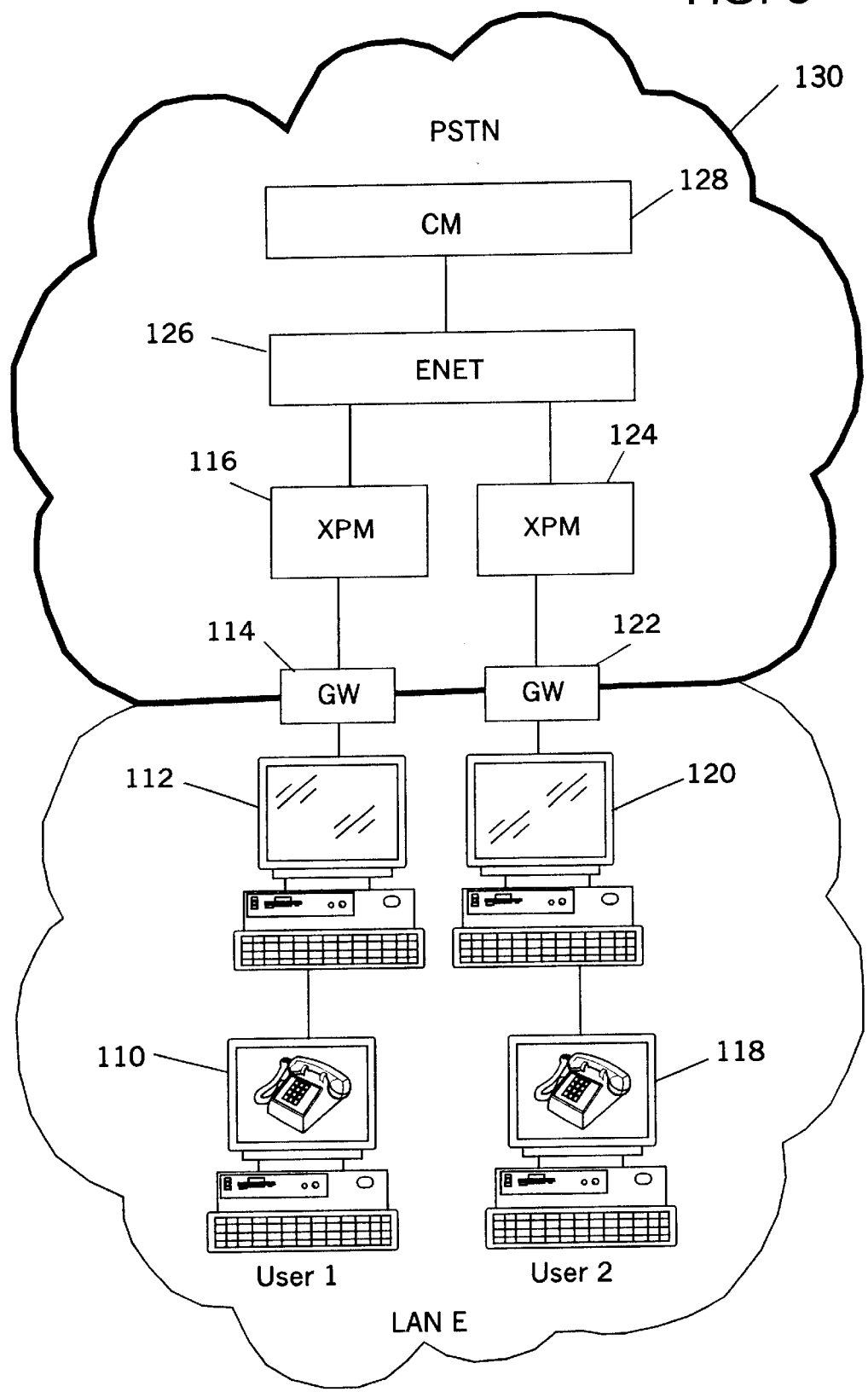

NETWORK RESOURCE CONSERVATION SYSTEM

BACKGROUND OF THE INVENTION

1. Field of the Invention

This invention relates to the field of communications network resource conservation systems. More specifically, this invention relates to a way in which network bandwidth is conserved and voice quality can be improved.

2. Description of Problem Solved

H.323 series of standards by the International Telecommunication Union (ITU) specify how telephony services can be offered on a Local Area Network (LAN) or Internet without guaranteed quality of service. H.323 clients can talk to each other using H.225 as call control signaling and H.245 as the channel control protocol. Voice-over-Internet-Protocol (VoIP) is a way to offer existing voice telephony services to H.323 clients. This invention provides an algorithm by which the H.323 clients can talk to each other directly via the packet based network even though the call was initially routed through the Switched Circuit Network (SCN), hence conserving the network sources and potentially improving the voice quality. The voice quality improvement will be apparent when both parties are on the same LAN and both parties are far away from the serving Public Switched Telephone Network (PSTN) switch. The two H.323 clients must transfer voice data via the telephone switch and the PSTN, even though the telephone switch is located at a remote location far away from the H.323 clients, and the H.323 clients are located on a common LAN or located on separate LANs that are linked via the Internet. A disadvantage of routing the voice through the telephone switch and the PSTN is that Network bandwidth is being wasted and voice quality is negatively impacted unnecessarily when two H.323 clients are talking through the PSTN if the two H.323 clients can make a direct communication connection via their networks.

What is needed is to provide a way by which users of H.323 terminal devices can talk to each other directly via a packet based network, i.e., the Internet, even though the call will be initially setup through the telephone switch and the PSTN and obtain all the supplementary services from the switch; hence conserving the PSTN resources and improving voice quality. Essentially, the bearer channel or basic telephone communications channel is established via the network and not through the telephone switch and the PSTN, thus limiting the number of times data must be converted to and from voice and packet data when being transferred between users as in a normal call. The voice quality improvement between linked users will be apparent when both parties are on the same LAN and both parties are far away from the serving telephone switch. In addition, Network bandwidth is being wasted by assigning communications channels via the PSTN. Furthermore, the communications system must be able to revert an existing call that is directly connected via the network, back through the telephone switch and the PSTN at the request of a user without interrupting the existing communications session via the packet based network.

Thus, an object of this invention is to provide a way by which H.323 clients can talk to each other directly via the packet based network, even though a call is initially setup through the telephone switch and the PSTN.

It is another object of this invention to conserve the resources of the PSTN by establishing data communications sessions directly via packet based networks, thus reserving network bandwidth and communications channels in the PSTN.

It is a further object of this invention to improve the quality of voice sessions when two H.323 clients are on the same LAN or on separate LANs that are networked, and both are far away from the serving telephone switch.

It is still a further object of this invention to minimize the number of times data is translated to and from voice and packet data between two H.323 clients.

SUMMARY OF THE INVENTION

The present invention solves the above problems by providing telecommunications infrastructures that can directly establish a voice path between two users via their LAN(s), thus not routing the voice path through the telephone switch and the PSTN as for a typical telephone call and yet get supplementary services from the PSTN switch. The telephone call will be setup through the telephone switch and the PSTN as for a normal call. However, the bearer channels will be established directly between the calling party and the called party via their LAN(s). Essentially, the calling party will initiate a call to the called party via an H.323 terminal device. When the setup messages from the calling party is routed through the telephone switch to setup the call, the telephone switch will determine whether the initiated call can be Intraswitched via the calling and called parties' LAN(s). Essentially, the telephone switch must determine whether a basic call has been requested and whether the calling party and called party both have H.323 terminal devices, capable of establishing a phone call, that are networked together. If so, the telephone switch will send messages to the calling party and the called party instructing them to open communications channels via their LAN(s). The calling party and the called party then establish a voice path via their LAN(s).

The present invention also provides a way to invoke supplemental features of telephony service, such as flexible calling, three way calling, etc. Since the telephone switch must be used to invoke supplemental features, the invention provides a way to revert an Intraswitched call through the telephone switch automatically when needed. Either party can notify the telephone switch that it wishes to use a supplemental feature. The telephone switch will determine whether the call must be reverted through the telephone switch and the PSTN to provide the requested supplemental service. If the call must be reverted, the telephone switch will automatically establish a communications channel between the calling and called parties through the telephone switch and the PSTN as in a normal telephone call. Once the call has been routed through the telephone switch and the PSTN, the two parties disconnect their current communications connection that is already Intraswitched through their LAN(s), without interrupting the existing communications session via the telephone switch and the PSTN.

BRIEF DESCRIPTION OF THE DRAWINGS

These and other features, aspects and advantages of the present invention will become better understood with regard to the following description, appended claims and accompanying drawings where:

FIG. 3 is a diagram of a telecommunications network that illustrates details of the embodiment shown in FIG. 2.

DETAILED DESCRIPTION OF PREFERRED EMBODIMENTS

To illustrate how the apparatus and method of the invention generally connects voice channels directly via a packet based network, we refer to the calling user as "User1" and the called user as "User2." When we refer to an H.323 terminal device, we are referring to a computer that has H.323 capability as described below, and therefore can establish a telephone call or a smart telephone that supports H.323 protocols. The computer can sit on a desktop such as a personal computer. Although, such a computer can sit on a desktop, it can also be a mobile or a laptop computer, and such terminology is not meant to limit the operating environment of the invention. When we refer to a computer desktop, we are referring to the "desktop" interface of a graphical user interface based operating system. An H.323 client is a user with an H.323 terminal device as described above. When we refer to an Intraswitched or Intraswitched call, we are referring to a call that is directly connected via a network. The H.323 refers to the International Telecommunication Union (ITU) H.323 platform and its related series of specifications such as H.225, H.245 and T.120. The H.323 platform and related series of specifications are well known in the art. More information about the H.323 platform may be found in the publications entitled "ITU-T Recommendation H.323 (11/96)", "ITU-T Recommendation H.245 (3/96)", and "ITU-T Recommendation H.225 (11/96)." All of these publications are incorporated herein by reference.

Figure 1:
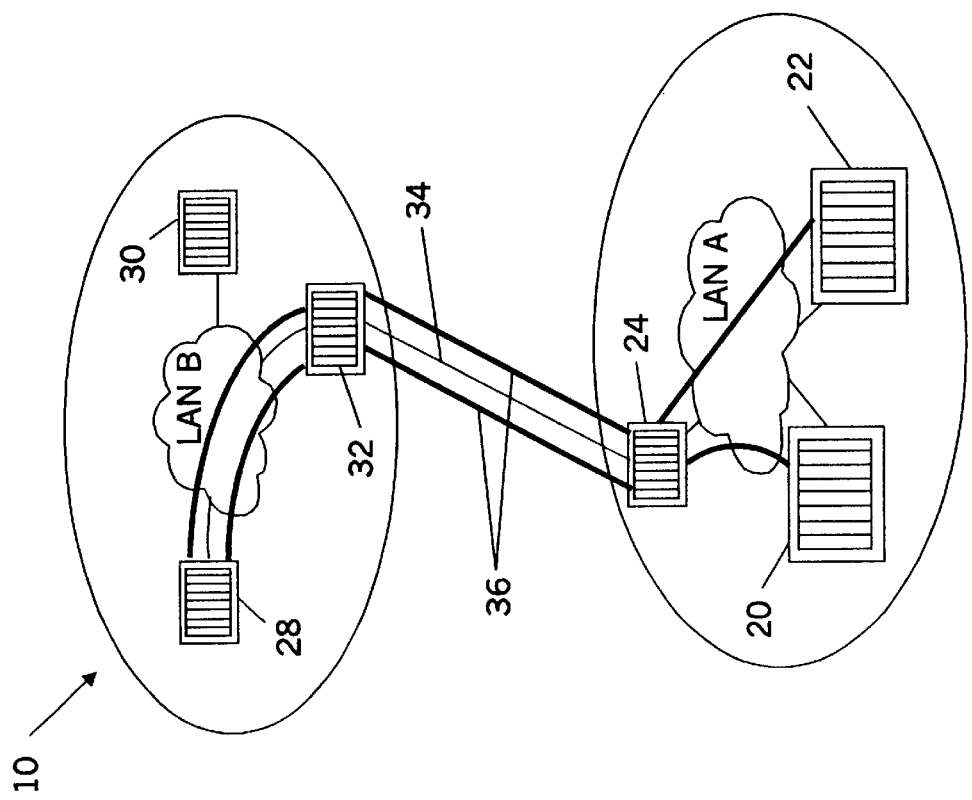
FIG. 1 is a diagram of a typical telecommunications network environment that establishes a voice communications channel through the telephone switch and a PSTN as for a normal call.

Referring now to FIG. 1, 10 generally illustrates a typical way of establishing a telephone call and shows how a call between User1 and User2 would travel through a central switching office to complete the transmission. The environment generally depicted by 10 comprises User1 and User2 both having H.323 terminal devices 20 and 22, respectively, a remote Gateway/telephone switch 28, a Gatekeeper 30, and a local router 24. User1 and User2 are H.323 clients with offices in the same local area. The H.323 terminal devices 20 and 22 have the capability of making a telephone call. H.323 terminal devices 20 and 22 and router 24 are all connected to Local Area Network (LAN) A. At the office location, Gateway/telephoneswitch 28, Gatekeeper 30 and router 32, are all interfaced to LAN B. Routers 24 and 32 are linked together via a hard wire connection line 34. Assuming that User1 makes a telephone call to User2, the setup of the telephone call, as well as the bearer channels voice path, illustrated by lines 36, must be established via the Gateway/telephone switch 28. To transfer voice between User1 and User2, the voice must be translated into packet data and vice versa. The translation of voice to packet data between User1 and User2 and packet data to voice is referred to as double encoding. For example, FIG. 1 shows User1 at the remote area sending voice to User2 and also in the remote area User 1 sends its voice to LAN A via its H.323 terminal device 20. LAN A takes this voice and translates it into packet data. LAN A sends this packet data to router 24, wherein router 24 transmits the packet data to router 32 via line 34. Router 32 sends the packet data to Gateway/telephone switch 28 where the packet data is translated back into voice. To complete the voice communication transfer to User2, Gateway/telephone switch 28 converts the voice back into packet data and sends this same packet data back to router 32. Router 32 transfers the packet data back to router 24 via line 34. Router 24 sends the packet data to LAN A, wherein the packet data is converted back to voice and transmitted to User2 via H.323 terminal device 22. The voice is sent form User1 to Gateway/telephone switch 28 across the enhanced network and routed back to the remote location to reach User2. Gateway/telephone switch 28 may be a digital central office, such as the DMS-100 manufactured by Nortel.

Transmission of the voice path lines 36 is via digital multiplex system enhanced network, taking two scarce links between the office location and the remote location. Voice path lines 36 take the form of bandwidth here, since there is no circuit switched connection between H.323 clients, User1 and User2. The bandwidth waste problem is caused by the fact that both of the H.323 clients, User1 and User2 are served by the DMS-100 switch.

Figure 2:
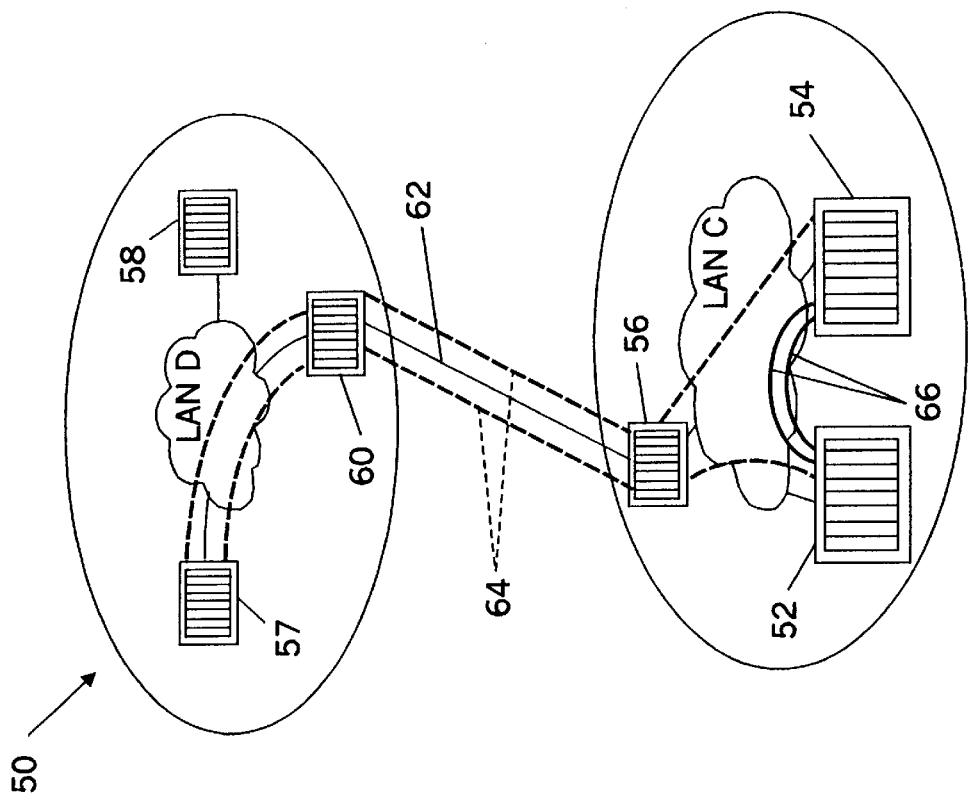
FIG. 2 shows a telecommunications network environment in accordance with one embodiment of the invention.

FIG. 2 is a diagram that shows a telephone communication configuration similar to the configuration shown in FIG. 1. In this configuration, the signal path remains the same but the voice path is directly from User1 to User2 in the remote LAN C. User1 and User2 have H.323 terminal devices 52 and 54, and router 56 which are all connected to LAN C. Gateway/telephone switch 57 is at a remote location. The Gateway/telephone switch 57, Gatekeeper 58 and router 60 are all connected to LAN D. Routers 56 and 60 are interfaced via a hard wire connection 62. Assuming that User1 makes a call to User2, User1 signals the call via its H.323 terminal device 52 and LAN C to router 56. Router 56 transmits the data to router 60 via line 62. Router 60 transmits the data to Gateway/telephone switch 57 via LAN D. In order to complete the setup of the call, Gateway/telephoneswitch 57 sends the messages to router 60 via LAN D. Router 60 transmits the messages to router 56. Router 56 transfers the messages to User2 via LAN C. The signaling path to setup the telephone call is shown as lines 64. However, the bearer communications channels are directly established between computer devices 52 and 54 via LAN C. Thus, the bearer communications channels are established directly between H.323 clients as shown by lines 66 via LAN C rather than through the telephone switch and the PSTN, in the manner illustrated by FIG. 1. Still referring to FIG. 2, the voice path is directly between User1 and User2 via LAN C. For example, voice is sent from User1 via H.323 terminal device 52 to LAN C. LAN C translates the voice into packet data. Once the packet data is sent through LAN C, it is converted back to voice and sent to User2 via H.323 terminal device 54.

The bandwidth on the link between the office location and the remote location can be saved by applying IP Intraswitching at the Gateway/telephone switch 57. Voice quality can be significantly enhanced since the voice path is directly between two H.323 clients, User1 and User2. Coupling the voice path directly between two H.323 clients eliminates the need for voice making a round trip through long distance links. This results in Gateway/telephone switch 57 resource conservation; the ENET/JNET connection is freed up; and the time switched connections in XPM are also freed up.

Still referring to FIG. 2, IP Intraswitching makes Internet Protocol Local Loops (IPLL) more attractive because one of the significant limitations of IPLL is removed. IP Intraswitching takes the distance between the two H.323 clients and the home location Gateway/telephone switch out of the equation during an Intraswitched call. The LANs referred to herein may be a packet based network.

FIG. 3 shows a detailed diagram of the telecommunications network of the embodiment illustrated in FIG. 2 and described generally above. User1 is equipped with a H.323 terminal device 110 that is connected to Gateway 114 via a Gatekeeper 112. User2, similarly has a H.323 terminal device 118 connected to Gateway 122 via Gatekeeper 120. Gateways 114 and 122 are linked via LAN E. Gateways 114 and 122 are connected in PSTN 130 to extended peripheral modules (XPMs) 116 and 124, respectively. Both XPMs 116 and 124 are linked to Computing Module (CM) 128 via ENET 126.

H.323 terminal devices 110 and 118 operate to establish the telephone call between User1 and User2. Gateways 114 and 122 operate pursuant to Voice-over-Internet-Protocol (VoIP) Gateways. Gateways 114 and 122 serve to convert packet data to traditional time division multiplexing (TDM) and vice versa. Thus, the function of Gateways 114 and 122 are essentially for converting voice to packet data, and packet data to voice. Gatekeepers 112 and 120 authenticate telephone calls of User1 and User2, respectively. For example, the Gatekeeper 112 tracks each call of User1 and Gatekeeper 120 tracks each call of User2 for billing purposes as well as performing other supplementary services. CM 128 and ENET 126 are essentially part of the PSTN 130. PSTN 130 is responsible for setting up telephone calls as well as establishing bearer communication channels.

Figure 4:
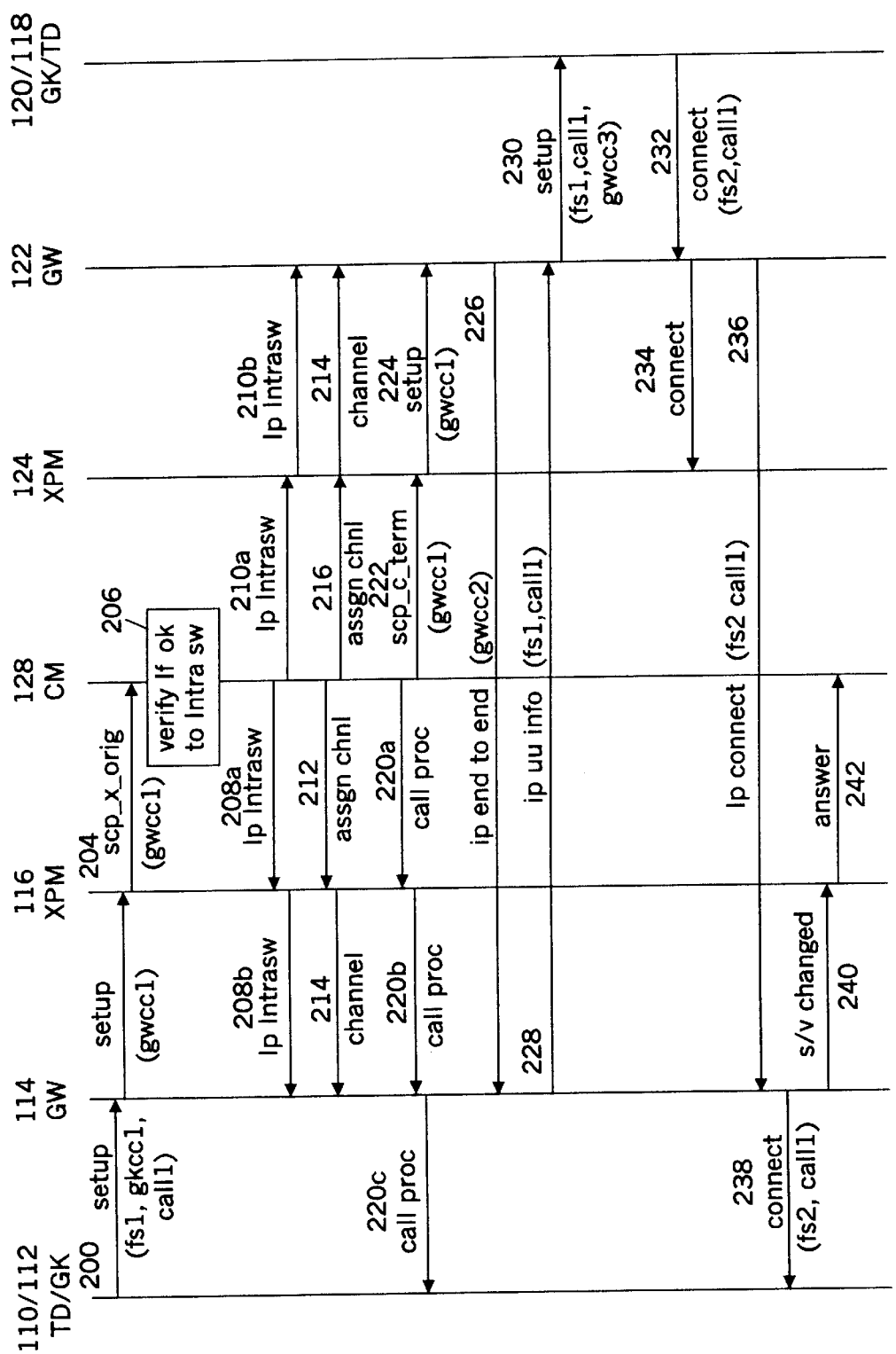
FIG. 4 is a call flow diagram that illustrates the sequence of messages sent between two callers using H.323 terminal devices.

FIG. 4 is a diagram that illustrates the sequence of messages sent between User1 and User2 during the establishment of an Intraswitched call as shown generally in FIG. 2 and in more detail in FIG. 3. H.323 terminal device 110 and Gatekeeper 112 of FIG. 3 are shown collectively in FIG. 4. Also H.323 terminal device 118 and Gatekeeper 120 of FIG. 3 are shown collectively in FIG. 4. Referring now to FIG. 4, by way of example, User1 notifies CM 128 that User1 wishes to make a telephone call to User2. This is typically done by User1 dialing the telephone number of User2 using H.323 terminal device 110, which automatically sends a setup message, at step 200, to Gateway 114. The setup message contains FastStart parameters, call identification information, the H.245 channel address, including the IP address and port number of H.323 terminal device 110, and the address for Gatekeeper 112. At step 202, Gateway 114 transmits a setup message containing the address of Gatekeeper 112 to XPM 116. XPMs 116 and 124 interpret instructions from CM 128 regarding setup of a telephone call. After XPM 116 receives the address of Gatekeeper 112, at step 204, XPM 116 translates the Gatekeeper address into a signaling control protocol (SCP). The SCP used herein is a standard protocol that is used to communicate information between H.323 terminal devices 110 and 118 and CM 128. Once CM 128 receives the SCP from XPM 116, CM 128 verifies whether the requested telephone call can be Intraswitched between User1 and User2 via LAN E (see FIG. 3). CM 128 then determines whether User1 and User2 are both VoIP agents, whether User1 and User2 are connected via a common network, whether the common network is too busy to successfully Intraswitch the telephone call, and whether the call is a basic two party call. The CM 128 also functions to determine parameters for a round trip delay. The round trip delay is measured by sending the "Round Trip Delay Request" message from User1 to User2, and measure the delay of the "Round Trip Delay Response" message which is a reply from User2. If the round trip delay is bad, the PSTN connection will be preserved, and no Intraswitching will be applied.

Still referring to FIG. 4, CM 128 determines if Intraswitching will be implemented. CM 128 sends messages to User1 and User2 informing each that Intraswitching will be utilized. Essentially, CM 128 notifies Gateway 114 by sending Intraswitching notification messages to Gateway 114, as shown in steps 208a and 208b. Similarly, CM 128 notifies Gateway 122 by sending Intraswitching notification messages, as shown in steps 210a and 210b.

At steps 220a, 220b and 220c, CM 128 sends a call proceeding message to User1 via XPM 116 and Gateway 114. CM 128, at step 222, sends a SCP to XPM 124 to notify User2 that User1 is calling. At step 224, XPM 124 sends a setup message containing the address of Gateway 114 to Gateway 122. In response, Gateway 122, at step 224, sends its IP address to Gateway 114. Gateway 114, at step 228, sends FastStart parameters and call identification information to Gateway 122. Step 230 shows Gateway 122 sending User1 FastStart parameters, call identification information and the address of Gateway 114 to User2 via H.323 terminal device 118. Once User2 answers the call, User2 sends connect messages to XPM 124 as shown in steps 232 and 234. These connect messages contain FastStart parameters of User2 and User1 call identification information. Gateway 122 then sends an IP connect message to Gateway 114, which contains User2 FastStart parameters and User1 call identification information in step 236. At step 238, Gateway 114 sends a connect message containing User2 FastStart parameters and User1 call identification information to User1. To complete the call, at step 240, the s/v changed message is sent to XPM 116. The s/v changed message is a typical message that is sent from a Gateway to a computer module to notify User1 that User2 has answered, provided that both parties are using ISDN telephones. It will be appreciated that since ISDN telephones are not used and XPMs 116 and 124 are not linked in the speech path, the s/v changed message must be simulated by Gateway 114. Essentially, once Gateway 114 sends connect message 238, Gateway 114 knows that User2 has answered the call and therefore automatically sends the s/v changed message to XPM 116. Finally, at step 242, XPM 116 sends an answer message to CM 128 to complete the call.

The instant invention recognizes that once a call has been Intraswitched, the call may need to be reverted back through the PSTN, as is the case for a normal call, without interrupting the current voice session. For example, User1 and User2 might need to utilize supplemental telephone services such as, flex calling or three-way calling after they have established an Intraswitched call. Since supplemental features can only be handled via the telephone switch in the PSTN, the call will have to be automatically reverted through the PSTN as is the case for a normal call.

Figure 5:
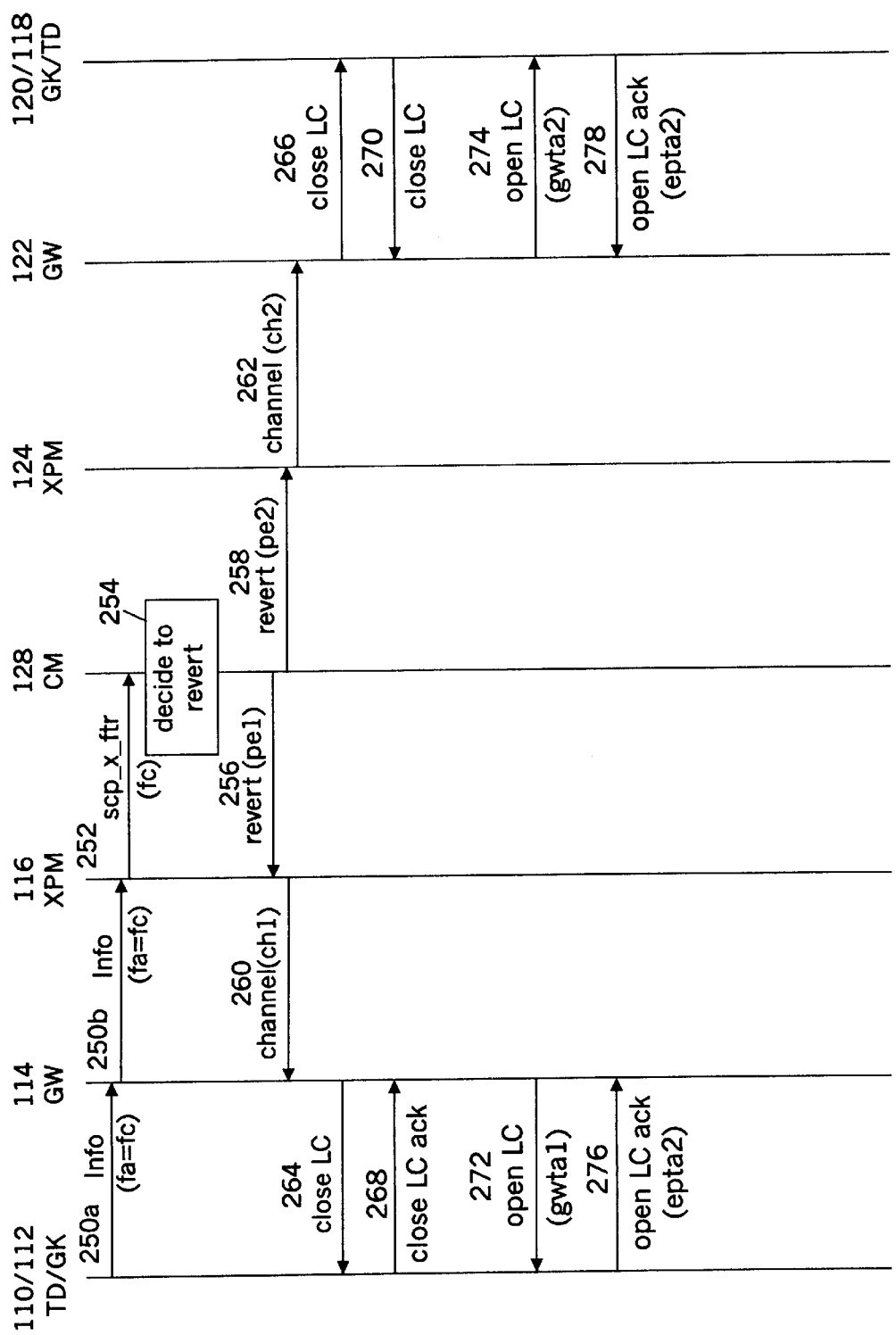
FIG. 5 is a call flow diagram that illustrates a revert feature of the invention, wherein an Intraswitched call is reverted through a PSTN.

FIG. 5 is a diagram that illustrates the call sequence of reverting a call back through the telephone switch (not shown) and illustrated in FIG. 4, after an Intraswitched call has been established, in the manner described for the first embodiment. Assuming that User1 and User2 have already established an Intraswitched call as illustrated in FIG. 4, and User1 now wants to invoke a supplemental service, such as flex calling, User1 must signal CM 128 that it wishes to make a flex call. To accomplish this, FIG. 5 shows that, at steps 250a and 250b, User1 sends a message to XPM 116 via Gateway 114 that it wishes to invoke a feature activator (fa), which is essentially a supplemental service offered by the telephone company. In this example, the fa is flex calling (fc). Then, at step 252, XPM 116 sends a SCP message to CM 128, notifying CM 128 that User1 is invoking a fc. Once CM 128 receives the SCP message, at step 254, CM 128 determines whether the current Intraswitched telephone call must be reverted through the telephone switch (not shown) in order to implement the requested fc. If reversion is required, CM 128 sends revert messages to XPMs 116 and 124 at steps 256 and 258, respectively. XMPs 116 and 124, assign channels via the PSTN (not shown) to transfer voice data between User1 and User2 through the PSTN at steps 260 and 262, respectively. Once the communications channels are established through the PSTN, the communications channels that were directly established between User1 and User2 via their common LAN (not shown) must be terminated. Therefore, Gateways 114 and 122 send a message to close the logical channel (LC) to thereby, disconnect the Intraswitched communications connection between the Gateways 114 and 122 and their respective user at steps 264 and 266, respectively. User1 and User2 send messages back to their respective Gateways 114 and 122 acknowledging that the Intraswitch connection has been terminated at steps 268 and 270, respectively. Gateways 114 and 122 both must establish a connection link to the channels that are assigned through the PSTN at steps 260 and 262 to User1 and User2. At steps 272 and 274, Gateways 114 and 122 send messages to open the LCs with their respective user. Finally, User1 and User2 respond at steps 276 and 278 by sending messages back to Gateway 114 and Gateway 122 acknowledging that the channels are open, thus allowing voice to transfer from User1 and User2 via the PSTN and telephone switch as in the case for a normal call.

Figure 6:
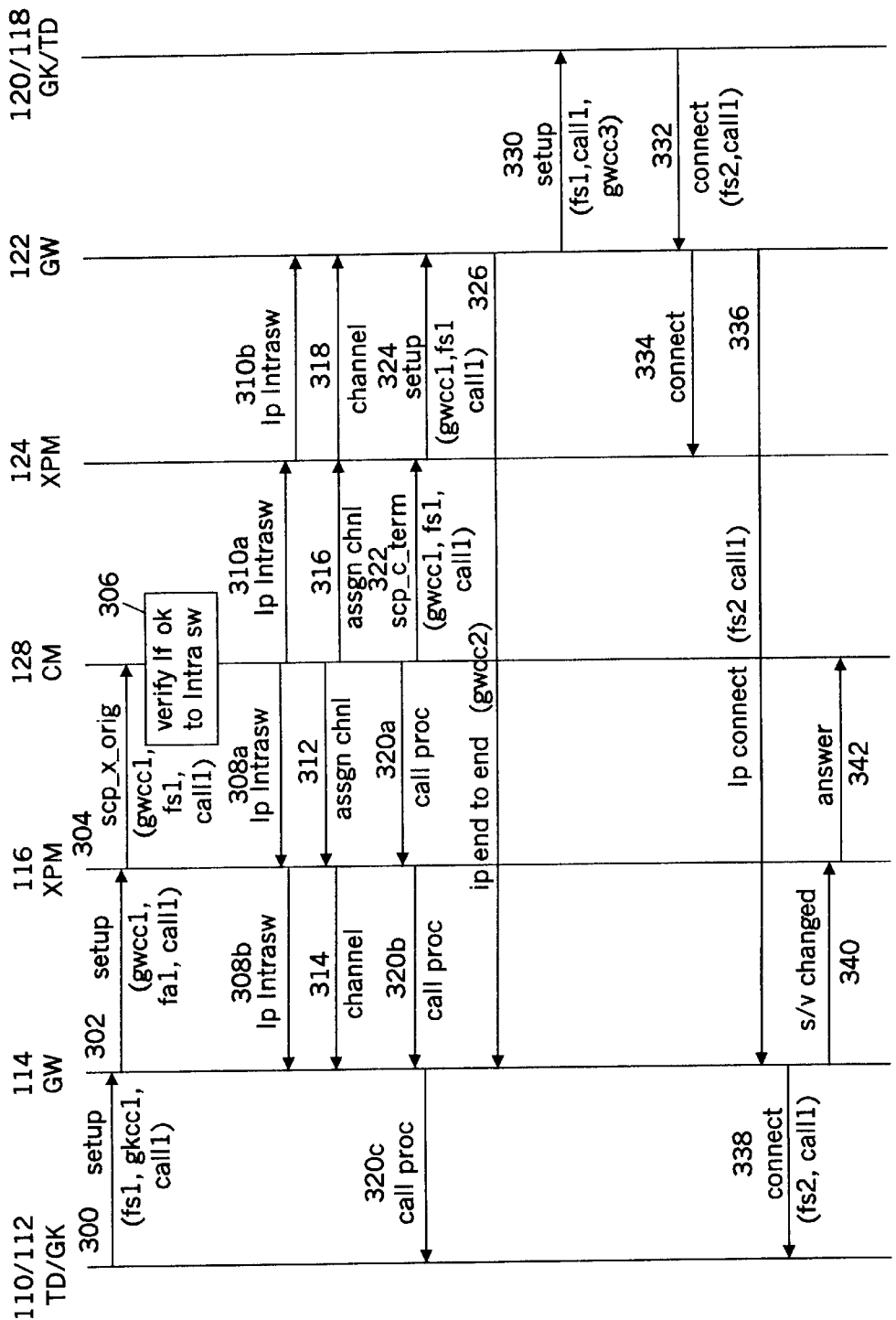
FIG. 6 is an alternate call flow diagram of the first embodiment of the invention as shown in FIG. 3.

It will be further appreciated that the call sequence set forth herein can be implemented in alternative ways. FIG. 6 illustrates an alternative sequence for messages sent between User1 and User2 during the establishment of an Intraswitched call in the manner described for the first embodiment and illustrated in FIG. 2 and FIG. 3. User1 notifies CM 128 that User1 wishes to make a telephone call to User2. This is typically done by User1 dialing the telephone number of User2 using H.323 terminal device 110, which automatically sends a setup message at step 300 in FIG. 6, to Gateway 114. This setup message contains FastStart parameters, call identification information, H.245 channel address including IP address and port number of H.323 terminal device 110 and the address of Gatekeeper 112. Referring still to FIG. 6, at step 302, Gateway 114 transmits the setup message containing the FastStart parameters, call identification information and the address of Gatekeeper 112 to XPM 116. After XPM 116 receives the setup message containing the FastStart parameters, call identification information and address of Gatekeeper 112, at step 304 XPM 116 translates this information into signaling control protocol (SCP). In this alternate call sequence, FastStart parameters and call identification information are sent to CM 128 before CM 128 determines whether the call will be Intraswitched. Once CM 128 receives the SCP from XPM 116, the CM 128 verifies whether the telephone call can be Intraswitched in the manner described in FIG. 4. Assuming that CM 128 determines Intraswitching will be implemented, CM 128 sends messages to User1 and User2 informing them that Intraswitching will be utilized. Essentially, CM 128 notifies Gateway 114 by sending Intraswitching notification messages, as shown in steps 308a and 308b. Similarly, CM 128 notifies Gateway 122 by sending Intraswitching notification messages, as shown in steps 310a and 310b.

Referring still to FIG. 6, at steps 320a, 320b and 320c, CM 128 sends a call proceeding message to User1 via XPM 116 and Gateway 114. CM 128, at step 322 sends a SCP to XPM 124 to notify User2 that User1 is calling. This SCP contains FastStart parameters and call identification information and the address of Gateway 114. At step 324, XPM 124 sends this information to Gateway 122. In response, Gateway 122, at step 326 sends its IP address to Gateway 114. Step 330 shows Gateway 122 sending the FastStart parameters, call identification information and the address for Gateway 122 to User2. Once User2 answers the call, User2 sends connect messages to XPM 124 as shown in steps 332 and 334. These connect messages contain FastStart parameters of User1 and User2 call identifications information. Gateway 122 then sends an IP connect message to Gateway 114, which contains FastStart parameters and call identification information of User2 (step 336). At step 338, Gateway 114 sends connect message containing FastStart parameters and call identification information of User2 to User1. A s/v changed message in step 340 is sent to XPM 116. Finally, at step 342, XPM 116 sends an answer message to CM 128 to thus complete the call.

Figure 7:
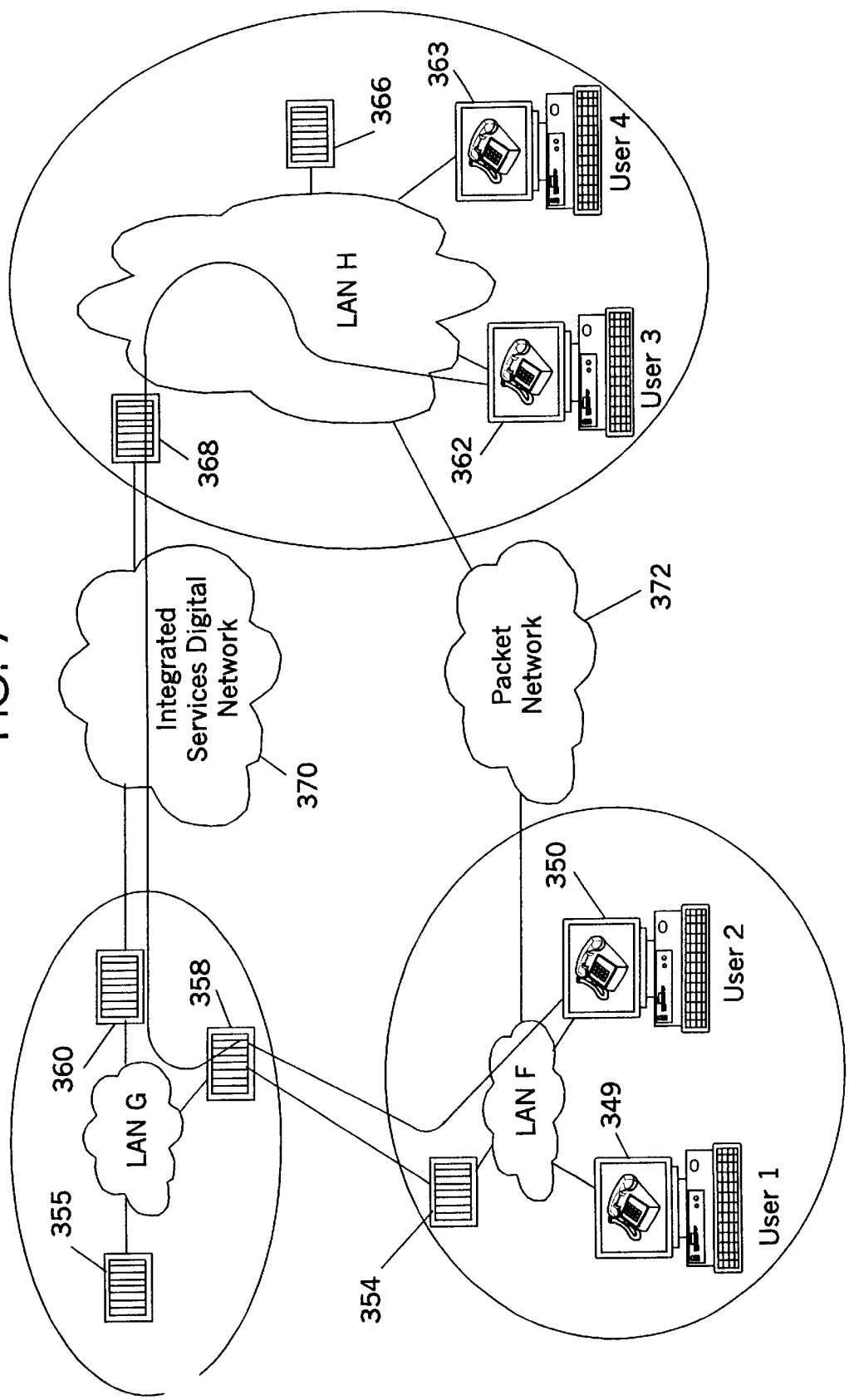
FIG. 7 is a diagram showing multiple users located on two separate LANs connected by the Internet in accordance with a second embodiment of the present invention.

FIG. 7 is a second embodiment of the invention illustrating a way that H.245 channel addresses of H.323 clients can be tandemed through the PSTN so that when a user in one remote location calls a user in another remote location, the voice path can be routed either through the PSTN or Internet. For example, H.323 client, User2, travels to a remote area serviced by LAN F calls a User3 while User3 is away in the remote area serviced by LAN H. Although User2 and User3 are located on separate LANs, LAN F and LAN H are networked via the Internet, User2 can be described as an Internet Protocol Local Loop (IPLL) user. User2 uses an H.323 terminal device 350 and router 354 that is connected to LAN F. User1 also has an H.323 terminal device 349 connected to LAN F. User2 is served by Gateway/telephone switch 360 that may take the form of a digital central office (public exchange) known as DMS-100, manufactured by Nortel, and Gatekeeper 355 that are located at the home office. Gateway/telephone switch 360, Gatekeeper 355 and router 358 are all connected to LAN G.

User3 and User4 are VoIP users. VoIP is described above in reference to the first embodiment. User3 uses a H.323 terminal device 362 that is connected to LAN H. User4 uses H.323 terminal device 363 which is also connected to LAN H. User3 is served by Gatekeeper 366 and Gateway/telephone switch 368, all connected to LAN H. Gateway/telephone switches 360 and 368 are linked via the Integrated Services Digital Network (ISDN) 370, which is known in the art. LAN F and LAN H in the remote locations are networked via the Packet Network 372, which may be the Internet.

Figure 8:
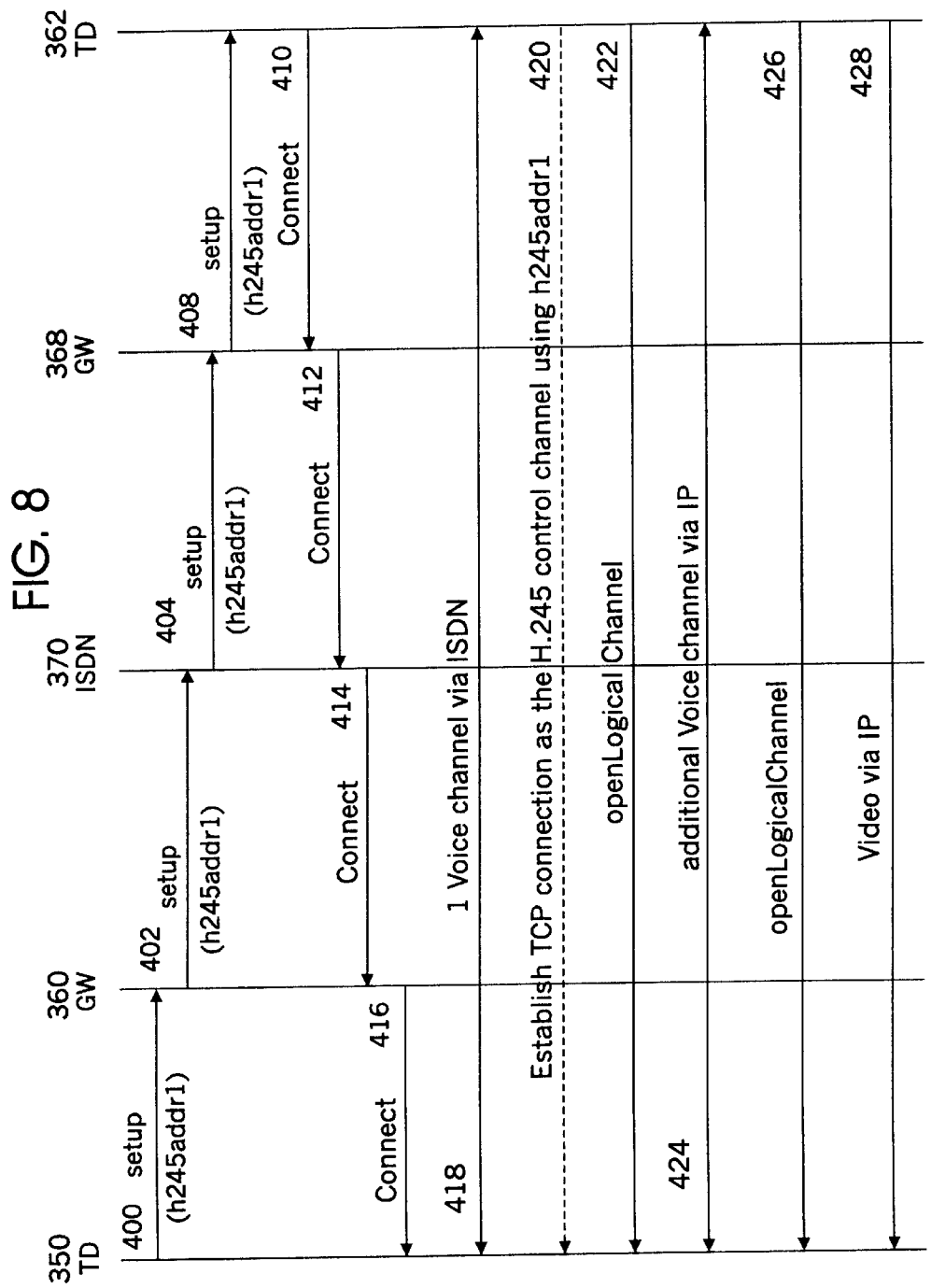
FIG. 8 is a call flow diagram that illustrates the sequence of messages sent between two callers using H.323 terminal devices that are located on separate LANs that are linked via the Internet.

FIG. 8 is a diagram that illustrates the sequence of messages sent between User1 and User2 during the establishment of an Intraswitched call in accordance with the second embodiment of the invention. Internet 372, LANs G, F and H, Gatekeepers 355, 366 and routers 354 and 358 all are not shown in FIG. 8, but may be referenced in FIG. 7. Assuming that User2 places a call to User3, User2, at step 400 will send a setup message to Gateway/telephone switch 360 via LAN F, router 354, router 358, LAN G and Gatekeeper 355. This setup message is a H.225 message containing the H.245 control channel address of User2, including the IP address and port number of User2. Gateway/telephone switch 360 will transfer this setup message to Gateway/telephone switch 368 via ISDN 370 as for a normal call, in steps 402 and 404. At step 408, Gateway/telephone switch 368 will send the setup message to User3, who is receiving the call, via Gatekeeper 366 and LAN H. At steps 410, 412, 414 and 416, User3 sends a connect message to User2. In step 418, User2 and User3 can establish a voice channel via ISDN 370 as in this case for a normal call. Alternatively, User2 and User3 may Intraswitch the call through LAN F and LAN H via Packet Network 372. The CM at the telephone company (not shown) will determine whether User2 and User3 can establish an Intraswitched call, in the manner described previously in reference to the first embodiment. If so, the call can be Intrawsitched at step 420. User3 will establish a transmission control protocol (TCP) connection between User3 and User2. In such case, since User3 received User2's H.245 address in step 408, User3 can complete the TCP connection in step 420. At steps 422 and 424, User3 opens a logical channel to User2 and establishes a voice channel between User2 and User3. User2 and User3 can transfer voice data through Packet Network 372 via LANs F and H. Additionally, at steps 426 and 428, User3 can open a logical channel that will allow User2 and User3 to transmit video data through Packet Network 372 and LANs F and H.

Appropriate computer program code in combination with appropriate hardware implements most of the elements of the present invention. This computer program code is often stored on storage media. This media can be a diskette, hard disk, CD-ROM, or tape. The media can also be a memory storage device or memory storage devices such as read-only memory (ROM) or random-access memory (RAM). Additionally, the computer code can be transferred over a network.

In the foregoing, we have described specific embodiments of our invention which provide ways in which telecommunications sessions can be Intraswitched and network bandwidth conserved and PSTN voice quality improved. One of ordinary skill in the art will quickly recognize that the invention has other applications in other environments. In fact, other embodiments and implementations are possible. The following claims are in no way intended to limit the scope of the invention to the specific embodiments described.

What is claimed is:

1. A method of establishing a voice communications pat between a caller and a called party, comprising:
   receiving a request at a switch, said request comprising a request to establish a telephone call;
   determining, at the switch, that the caller and the called party are capable of receiving packet-based communications; and
   creating a voice path between the caller and the called party by routing the voice path through a packet-based network and by not routing the voice path through the switch.

2. The method of claim 1 wherein creating a voice path between the caller and the called party comprises creating a voice path on a single LAN between the caller and the called party.

3. The method of claim 1 wherein receiving a request at a switch comprises receiving a request at a switch in a Public Switched Telephone Network (PSTN).

4. The method of claim 1 wherein determining that the caller and the called party are capable of receiving packet-based communications comprises determining if the caller and the called party are using H.323 compliant equipment.

5. The method of claim 1 further comprising monitoring at the switch requests for supplemental features.

6. The method of claim 5 wherein monitoring requests for supplemental features comprises monitoring for requests selected from the group consisting of: flexible calling and three way calling.

7. The method of claim 5 further comprising bringing the voice path onto a Public Switched Telephone Network (PSTN) after receipt of a request for supplemental features.

8. The method of claim 5 further comprising routing the voice path through the switch after receipt of a request for supplemental features.

9. The method of claim 1 wherein creating a voice path comprises sending a first setup message to the caller and a second setup message to the called party.

10. A switch in a telecommunications network, said switch adapted to establish a voice communication path between a caller and a called party, comprising:
    a control system adapted to:
      receive a request to establish a telephone call;
      determine that the caller and the called party are capable of receiving packet-based communications; and
      create a voice path between called and the called party by routing the voice path through a packet-based network and by not routing the voice path through the switch.

11. The switch of claim 10 wherein said control system adapted to create a voice path creates a voice path on a single LAN between the caller and the called party.

12. The switch of claim 10 wherein the switch is adapted to function with a Public Switched Telephone Network (PSTN).

13. The switch of claim 10 wherein said control system is adapted to monitor requests for supplemental features.

14. The switch of claim 13 wherein said control system is further adapted to bring the voice path onto a Public Switched Telephone Network (PSTN) after receipt of a request for supplemental features.

15. The switch of claim 13, wherein said control system is further adapted to send a first setup message to the caller and a second setup message to the called party.

16. A computer readable medium comprising software adapted to operate on a switch in a telecommunications network, said software to establish a voice communications path between a caller and a called party, said software adapted to:
    receive a request at the switch, said request comprising a request to establish a telephone call;
    determine, at the switch, that the caller and the called party are capable of receiving packet-based communications; and
    create a voice path between the caller and the called party by routing the voice path through a packet-based network and by not routing the voice path through the switch.

17. The computer readable medium of claim 16 wherein said software adapted to create a voice path between the caller and the called party comprises software adapted to create a voice path on a single LAN between the caller and the called party.

18. The computer readable medium of claim 16 wherein said software adapted to receive a request at the switch comprises software adapted to receive a request at the switch in a Public Switched Telephone Network (PSTN).

19. The computer readable medium of claim 16 wherein said software is further adapted to monitor requests for supplemented features.

20. The computer readable medium of claim 19 wherein said software adapted to monitor requests for supplemental features comprises software adapted to monitor for requests selected from the group consisting of flexible calling and three way calling.

21. The computer readable medium of claim 19 wherein said software is further adapted to bring the voice path onto a Public Switched Telephone Network (PSTN) after receipt of a request for supplemental features.

22. The computer readable medium of claim 19 wherein said software is further adapted to route the voice path through the switch after receipt of a request for supplemental features.

23. The compute readable medium of claim 16 wherein the software adapted to create a voice path is further adapted to send a first setup message to the caller and a second setup message to the called party.

24. The computer readable medium of claim 19 wherein the software adapted to determine that the caller and the called party are capable of receiving packet-based communications comprises software adapted to determine if the caller and the called party are using H.323 compliant equipment.

* * * * *

UNITED STATES PATENT AND TRADEMARK OFFICE
CERTIFICATE OF CORRECTION

| | | |
|---|---|---|
| PATENT NO. | : 6,636,508 B1 | Page 1 of 1 |
| APPLICATION NO. | : 09/249696 | |
| DATED | : October 21, 2003 | |
| INVENTOR(S) | : Li et al. | |

It is certified that error appears in the above-identified patent and that said Letters Patent is hereby corrected as shown below:

In the Claims

Col. 9, line 48, claim 1

--A method of establishing a voice communications pat-- should read

--A method of establishing a voice communications path--

Signed and Sealed this

Nineteenth Day of November, 2013

Teresa Stanek Rea
*Deputy Director of the United States Patent and Trademark Office*